Patented Jan. 6, 1931

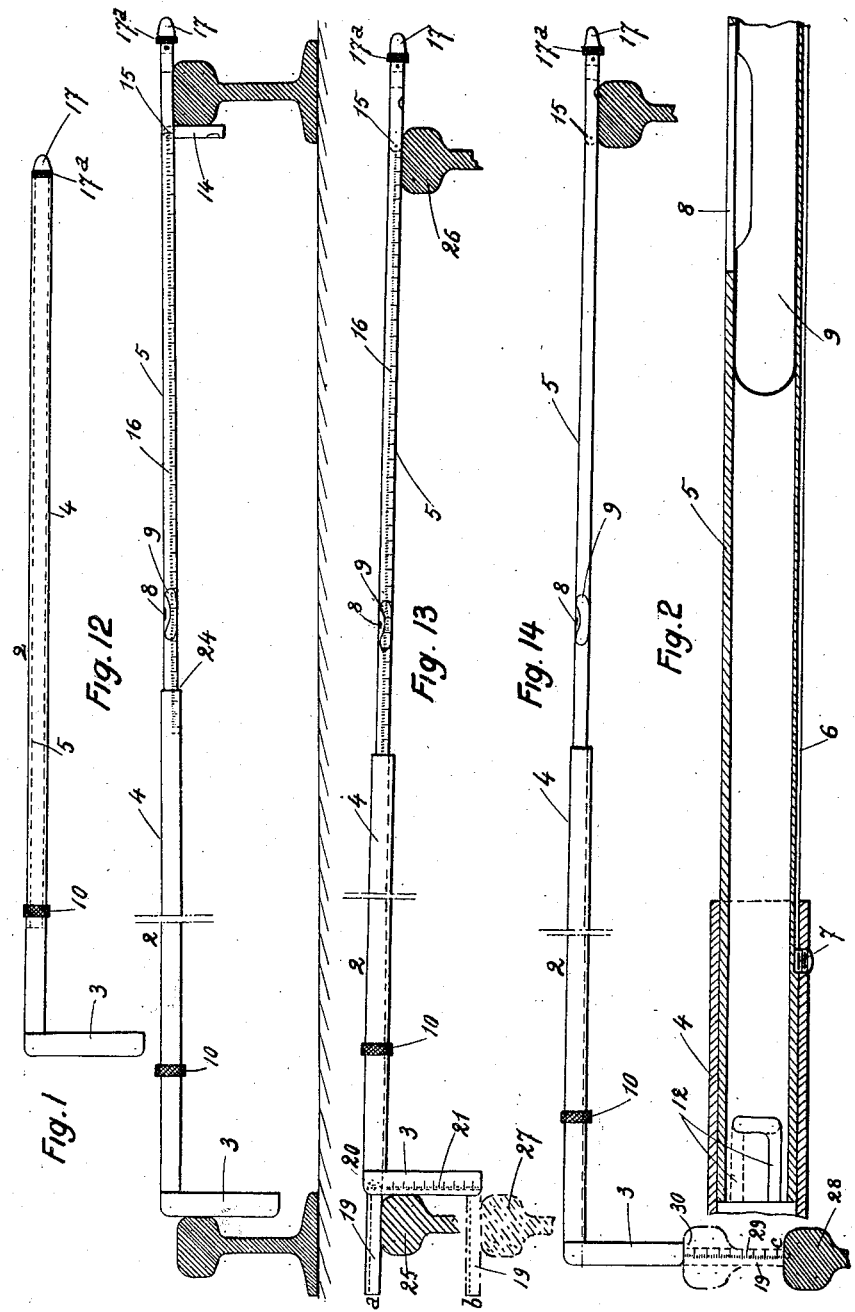

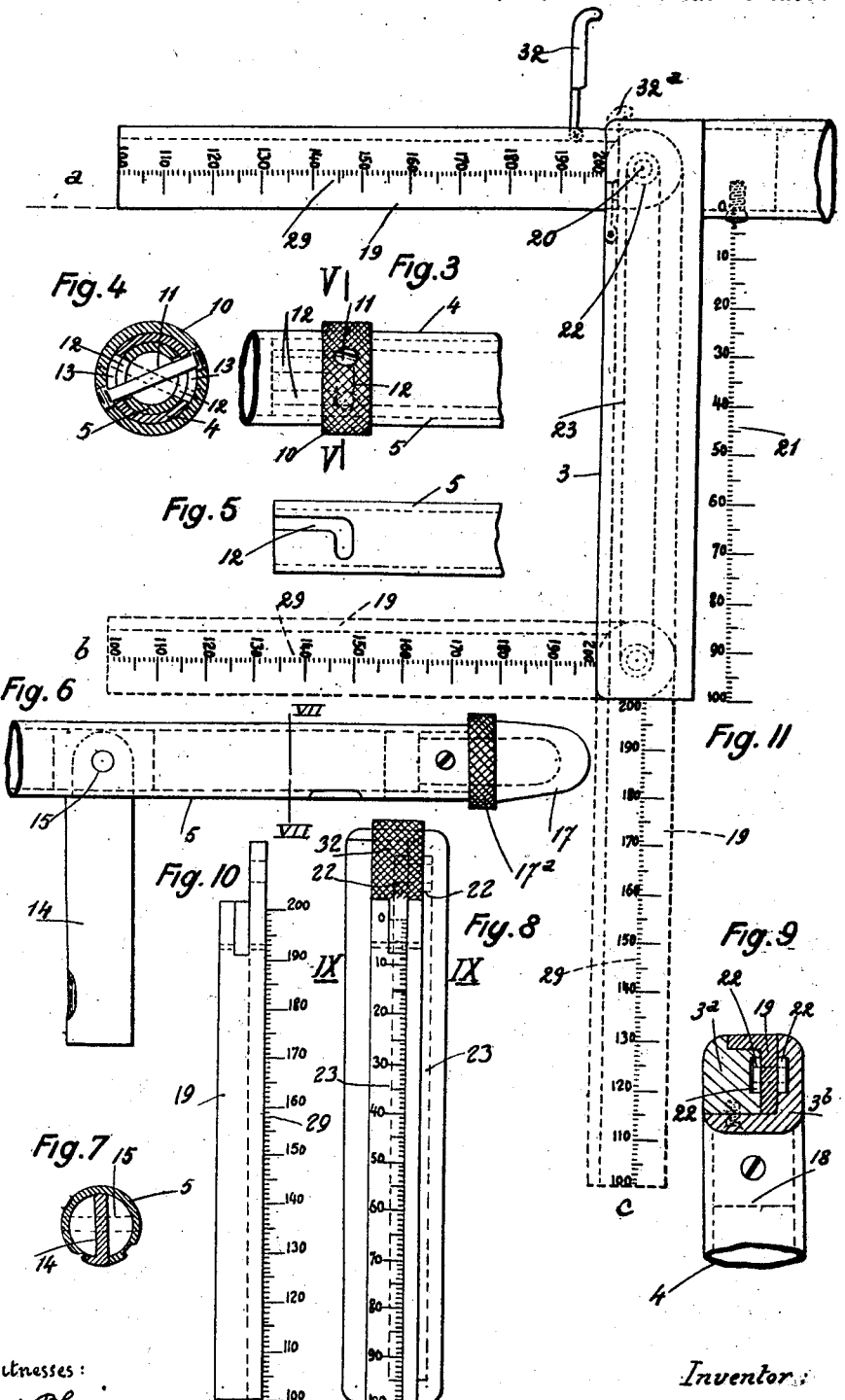

1,788,080

UNITED STATES PATENT OFFICE

JULIEN BOUGUES, OF STRASBOURG, ALSACE, FRANCE

CANE FOR CONTROLLING RAILWAY TRACKS

Application filed October 23, 1928, Serial No. 314,371, and in Germany October 24, 1927.

For the purpose of laying lines and of maintaining the same in repair the trackmen are supplied with rules of wood or of iron or with special forms permitting of testing either the gauge of the tracks or their level in alignment or their cant in the curves.

These instruments are cumbersome and heavy to carry outside the workshops, and they can be used only by the surveyors and controllers of the tracks the business of whom is, to examine the state of the tracks in order to prevent the accidents which might be caused by widenings or slackings, deformations or getting out of level of the tracks.

The instrument according to this invention and which has the form and the dimensions of a walking stick is of light weight, easy to carry and permits the surveyors to test and verify in the course of their visits any gauge of the track and its level as well as the cant in the curves.

This instrument is shown by way of example in the accompanying drawing in which:—

Fig. 1 shows the cane in the inoperative position.

Fig. 2 shows on enlarged scale the point at which the two tubes forming the cane are telescoped the one in the other.

Fig. 3 shows the device for fixing the inner tube in the outer tube.

Fig. 4 is a cross section on line V—V of Fig. 3.

Fig. 5 shows the end of the inner tube, facing the handle.

Fig. 6 shows the other end of this inner tube.

Fig. 7 is a cross section on line VII—VII of Fig. 6.

Fig. 8 is a rear elevation of the handle.

Fig. 9 is an inverse section on line IX—IX of Fig. 8.

Fig. 10 shows separately the rule of the handle.

Fig. 11 shows the handle and indicates the different positions of its rule.

Fig. 12 illustrates the arrangement of the cane for testing the track gauge.

Figs. 13 and 14 illustrate how the cane has to be used for verifying the level and the cant.

The instrument according to the invention consists essentially of a stick 2 (Fig. 1) of the length of an ordinary walking stick and of a handle 3 perpendicular to said stick. This stick is composed, as shown in Figs. 2 to 7, of two concentric tubes 4, 5 of aluminium, the tube 5 telescoped with slight friction and without clearance in the tube 4. A groove 6 extends along almost the entire length of the inner tube 5 to ensure the proper guiding in the outer tube 4 by means of a guide pin 7 in said outer tube. An aperture 8 in the inner tube 5, diametrically opposite the direction of the handle 3, permits of reading the indications of a bubble level 9 mounted and fixed in said tube 5.

In the inoperative position the inner tube 5 is securely fixed in the outer tube 4, for instance by means of a ring 10, roughened on the outer surface and carrying a bolt 11 adapted to engage with two bayonet grooves 12, 12 in the end of the inner tube 5. Two transverse cavities 13, 13 in the outer tube 4 allow the bolt 11 to pass and the ring 10 to carry out the part rotation necessary to bring said bolt 11 in engagement with the transverse parts of the slots 12, 12 of the inner tube 5.

A flap 14 hingedly mounted at 15 on the inner tube 4 near the end of the same is accommodated in the inoperative position in said tube, which is accordingly indented, and it can be turned to the outer side to stand perpendicularly to said tube in the same plane and at the same side as the handle 3, the amount of turning of said flap 14 being limited to 90° by a suitable stop.

A graduation 16 from 1,480 meters to 0.875 meters, engraved on the inner tube 5 completely developed and starting from the end of the outer tube 4 to the right edge of the open flap 14, permits of reading on the inner tube 5 at the end of the outer tube 4 the different gauge distances of the tracks to be tested.

A cane-ferrule 17 is fixed by means of a screw on the outer end of the inner tube 5. The thickened portion 17a of this ferrule is milled to facilitate pulling the inner tube 5 out of the outer tube 4.

The handle 3 of the cane (Figs. 8 to 11) is composed of two parts 3a and 3b united by means of screws. The part 3b has a cylindrical tail piece 18 standing at right angles and designed to be inserted without clearance in the corresponding end of the outer tube 4 and to be fixed in position by means of a screw.

A rule 19 is accommodated in the inoperative position in the handle but adapted to be turned 90° around an axle 20 and it can be placed then on a distance of 100 mms., which corresponds to the length of the handle, different perpendicular positions to said handle from the position a to the position b indicated in Fig. 11. A graduation 21 is engraved on the handle (the graduation being shown for clearness sake in Fig. 11 at the side of the handle), the zero registering very accurately with the inner surface of tube 5. The rule 19 might be extended from the handle in alignment of the same a distance of 100 mms. into the position c.

The rule 19 carries, preferably at its upper part and near the tail, a small flap 32 which is hingedly mounted. In the inoperative state this flap (position 32a Fig. 11) prevents displacing of the rule 19 and it covers the hollow space existing above the rounded portion of the tail of this rule. Oscillated about 90° it assists in the longitudinal displacement of said rule.

The section in the form of an inverted L, preferably given to this rule, permits its flap, in order to limit the rotation, to abut against the upper rabbet of the part 3a, i. e. against the face of this part which is graduated from 0 to 100 mms. (graduation 21) and further to prevent said rule from turning with regard to the handle to an angle greater than 90°.

The rule 19 in the inoperative position forms an integral part of the handle 3, and its flap hides said graduation 21. This rule is graduated itself on one of its side faces from 100 mms. (lower part) to 200 mms. (upper part), the reading being done from the position b to the position c towards the end of the handle.

The axle 20 on which two rollers 22 are mounted permits of the head of the rule rotating, of displacing the same from the position a to the position b, and of shifting it into the position c. The two parts 3a, 3b of the handle are consequently indented at 23, 23 for accommodating said rollers 22.

The movement of the rule 19 to the different positions which it may assume is effected with slight friction, however sufficiently great to securely hold the rule in its different positions.

The rule 19, instead of having a cross section in the form of an inverted L, might be simply flat, the flap 32 being suppressed. In this case the upper rabbet of the handle is also suppressed and in order that the rotation of the rule around its axle be limited and the rule be maintained open in the normal position with regard to the handle for testing the level and the cant comprised between 0 and 100 mms. its tail, instead of being rounded in semicircle, would be rounded only a quarter of a circle, the other portion being cut at right angle in order that the shoulder thus formed will abut in the open position of the rule against the bottom of the corresponding cavity of the handle. The graduation which in the first form of construction described was provided in the rabbet of the handle is in this form of construction marked directly on the upper face of one of the parts of the handle.

The control cane according to the invention is used in the following manner.

To test the gauge of tracks (Fig. 12) the inner tube 5 is pulled out partly and the end flap 14 is oscillated into a position perpendicular to said tube 5.

The handle end of the cane is then placed against the inner edge of one of the rails, the handle turned vertically downward, whereupon the inner tube 5 is pulled out until the outer edge of flap 14 abuts against the inner edge of the head of the other rail, the apparatus being placed normally to the axis of the track. At the point 24 forming the end of the outer tube 4 the registering graduation of the inner tube indicates the accurate gauge of the track at the part in question.

(b) To test the level of the track (Fig. 13), the inner tube is pulled out completely the flap 14 being not open. The rule 19 of the handle is brought into the position perpendicular to the handle, care having to be taken that its lower face registers accurately with the zero of the graduation 21 of the handle. The cane is then placed on the rails so that the vertical handle 3 abuts against the inner edge of the head of one of the rails, for instance rail 25, the rule 19 resting on the upper face of said rail and the other end of the cane resting upon the upper face of the other rail 26, the whole apparatus being placed normally to the axis of the track. If the track is level, the air bubble of the level 9 is standing at the centre of the aperture 8 of the cane.

(c) To test the cant or super-elevation of the track in the curves, when the same is comprised between zero and 100 mms. (Fig. 13), the cane, the rule 19 of which is completely open and the inner tube 5 is completely pulled out, i. e. similar to the testing of level, is placed on the rail so that the rule 19, as indicated in dash dot lines, rests on the upper face of rail 27 of the lower line, the other end of the cane resting on the upper surface of the other rail 26, whereupon the rule 19 is displaced parallel to itself from the position a into the position b until the bubble level 9 indicates the horizontal position. On the graduation 21 on the handle of the cane the division line registering with the lower edge of rule 19 indicates the super-elevation of the high line of the track with regard to the low line of the same.

(d) For testing the cant, when it is comprised between 100 and 200 mms. (Fig. 14), the cane is placed in a position similar to that described under c, the rule 19 resting however in the handle and its end bearing on the centre of the upper face of rail 28 of the low line. The rule 19 is then shifted in the longitudinal direction in the handle towards the position c by lifting the handle 3. When the bubble level 9 of the cane indicates the horizontal position, the division line on the graduation 29 of rule 19, corresponding to the end of the handle, indicates the cant of the track.

The different elements of this cane are preferably made of aluminum, in order to reduce the weight.

Besides the essential and most direct applications which have been described, the cane according to the invention might be used also for testing the inclinations of the rails, gradients of the track (profile in longitudinal direction) and the parallelism of the wheels of vehicles (wagons or locomotives), said parallellism having frequently to be verified after derailments.

When the cane according to the invention has to be used for testing electrified tracks, comprising insulated rails or having the electric block, the handle of this cane will be made of a special wood so that no deviations of the electric current can be caused.

I claim:—

A control cane for testing gauges of railway tracks, the level and the cant of the same, comprising in combination a tubular stick, a tube telescoped into said tubular stick and graduated along one side, a bubble level in said inner tube, a handle fixed in the end of said tubular stick in an accurately perpendicular direction having a graduation, the zero of which registers very accurately with the inner surface of said inner tube, said handle having inner grooves, a graduated rule in said handle, lateral rollers on said rule adapted to slide in said inner grooves of said handle, and an axle on which said rollers are mounted and around which said graduated rule can turn 90°, its upper extreme position being such that its lower edge registers with the said inner surface of said inner tube.

In testimony whereof I affix my signature.

JULIEN BOUGUES.